S. A. HUNTLEY.
VEHICLE WHEEL RIM.
APPLICATION FILED APR. 28, 1909.
974,796.
Patented Nov. 8, 1910.
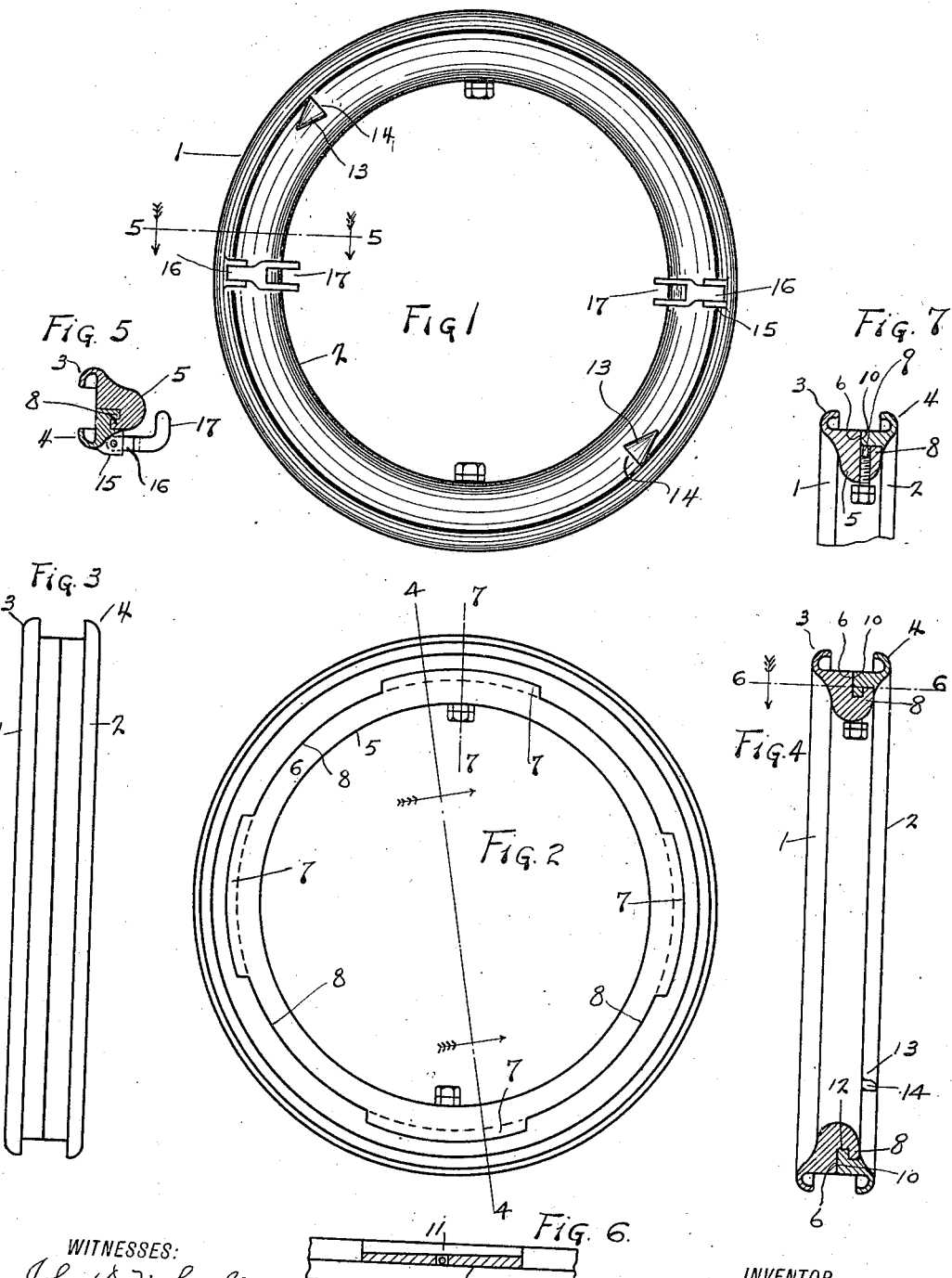
WITNESSES:
John D. McLaughlin
Harry C. Schroeder
INVENTOR
Stephen A. Huntley,
BY
ATTORNEY.

UNITED STATES PATENT OFFICE.

STEPHEN A. HUNTLEY, OF KANSAS CITY, MISSOURI, ASSIGNOR, BY DIRECT AND MESNE ASSIGNMENTS, OF ONE-THIRD TO GEORGE W. SLATER AND ONE-THIRD TO JOSEPH M. BENHAM, BOTH OF OAKLAND, CALIFORNIA, AND ONE-THIRD TO W. E. OTIS, JR., OF RENO, NEVADA.

VEHICLE-WHEEL RIM.

974,796. Specification of Letters Patent. Patented Nov. 8, 1910.

Application filed April 28, 1909. Serial No. 492,757.

*To all whom it may concern:*

Be it known that I, STEPHEN A. HUNTLEY, a citizen of the United States, residing at Kansas City, in the county of Jackson and State of Missouri, have invented certain new and useful Improvements in Vehicle-Wheel Rims, of which the following is a specification, reference being had therein to the accompanying drawing.

This invention relates to wheel rims, and has specially in view a rim made in separable sections so that a tire carried thereby may be quickly removed, or one section of the rim removed to permit access to be had to the tire for repairs and the like.

The object of this invention is to provide an improved wheel rim composed of two sections held together in interlocking wedging engagement and means for locking them in such engagement.

Figure 1 is a view in side elevation of the improved sectional rim. Fig. 2 is a similar view of the main section thereof. Fig. 3 is a transverse sectional view of the rim. Fig. 4 is a sectional view taken on the line 4—4, Fig. 2. Fig. 5 is a sectional view taken on the line 5—5, Fig. 1. Fig. 6 is a detail sectional view taken on the line 6—6, Fig. 4. Fig. 7 is a detail sectional view taken on the line 7—7, Fig. 2.

Referring to said drawings by numerals 1 designates the primary section of the rim and 2 the auxiliary section thereof. Said two sections are each provided with a rounded upstanding flange on its outer edge, designated by the numerals 3 and 4 which "clench" with the base of a tire in the usual manner. The primary section 1 has an inwardly projecting portion 5 which is formed with a tread portion 5' and a ring-like portion of less width than the body portion and has one side which is flat, as indicated at 6 and is provided at regular intervals with recesses 7 and alternating wedging portions 8, said recesses being connected by means of a groove 9 which extends between the wedging portions and the said flat portion 6. The auxiliary section 2 is formed with a flat abutment face 10 and a tread side 10' and with alternating recesses and wedging portions 11 and 12 similar to the recesses and wedging portions of the primary section 1 and with an inwardly projecting annular rim which fits snugly against the rim-like portion 5 of the primary section. Said section 2 is also provided with two or more outstanding lugs 13 having a flat end 14. Handles 15 are hinged to lugs 16 carried by said section 2, said handles having their free ends bifurcated as indicated at 17 and inturned, as is shown more clearly in Fig. 5 of the drawings.

In assembling the two sections together, they are manipulated to cause the wedging portions of one section to enter the recesses of the other section when the sections are turned on each other in opposite directions, the flange of one section moving lengthwise in the groove of the other section till the wedging portions of the flanges interlock, after which the handles 15 are turned inwardly so that their forked or bifurcated ends will engage with the spokes of the wheel and prevent the sections from becoming unlocked. To disconnect the sections the handles may be used to separate the sections, or if additional force is required, a tool may be inserted between the forked end of said handle so as to use the leverage for prying against the spokes and thereby force said sections in opposite directions and break the wedging engagement between them. Should the sections become tightly jammed together, it will be seen that the lugs 13 may be hammered upon by a suitable tool to separate the sections.

The primary section 1 is provided with an opening 19 in which is adapted to be located an inflating valve 2 for a tire.

What I claim as my invention is:—

A wheel rim comprising a main section and an auxiliary section, the main section being provided with alternating wedging portions and recesses, the auxiliary section being provided with similar wedging portions and recesses adapted for complemental interlocking engagement with the corresponding portions of the main section, said auxiliary section having a plurality of lugs projecting therefrom, and a lever pivoted to each lug and having its free end bifurcated, said bifurcated end being designed to engage opposite sides of the spokes of the wheel to prevent displacement of the sections.

In testimony whereof I hereunto affix my signature in presence of two witnesses.

STEPHEN A. HUNTLEY.

Witnesses:
  GEO. W. SLATER,
  H. C. SCHROEDER.